United States Patent
Tilbor et al.

(10) Patent No.: US 6,811,460 B1
(45) Date of Patent: Nov. 2, 2004

(54) FLYING TOY VEHICLE

(75) Inventors: Neil Tilbor, New Smyrna Beach, FL (US); Michael G. Hetman, New Smyrna Beach, FL (US); Masaki Suzuki, Yamagata (JP); Charles Sink, Friday Harbor, WA (US)

(73) Assignee: Leynian Ltd. Co., New Smyrna Beach, FL (US)

( * ) Notice: Subject to any disclaimer, the term of this patent is extended or adjusted under 35 U.S.C. 154(b) by 0 days.

(21) Appl. No.: 10/634,566

(22) Filed: Aug. 5, 2003

(51) Int. Cl.[7] .............................................. A63H 27/00
(52) U.S. Cl. .............................. 446/34; 446/37; 446/57
(58) Field of Search ............................. 446/34, 36, 38, 446/41, 45

(56) References Cited

U.S. PATENT DOCUMENTS

| | | | | |
|---|---|---|---|---|
| 3,181,816 A | * | 5/1965 | Pfleiderer | 244/17.17 |
| 3,605,328 A | * | 9/1971 | Kilroy, Jr. | 446/41 |
| 4,184,654 A | * | 1/1980 | Herrera | 244/8 |
| 4,718,874 A | * | 1/1988 | Warren | 446/36 |
| 4,781,642 A | * | 11/1988 | Stanzel | 446/38 |
| 5,030,157 A | * | 7/1991 | Silverglate | 446/48 |
| 5,297,759 A | * | 3/1994 | Tilbor et al. | 244/17.11 |
| 5,634,839 A | * | 6/1997 | Dixon | 446/37 |
| 5,672,086 A | * | 9/1997 | Dixon | 446/37 |
| 5,971,320 A | * | 10/1999 | Jermyn et al. | 244/17.25 |
| 6,425,794 B1 | * | 7/2002 | Levy et al. | 446/34 |
| D465,196 S | * | 11/2002 | Dammar | D12/328 |
| 6,659,395 B2 | * | 12/2003 | Rehkemper et al. | 244/17.11 |
| 6,688,936 B2 | * | 2/2004 | Davis | 446/37 |

* cited by examiner

*Primary Examiner*—Derris H. Banks
*Assistant Examiner*—Ali Abdelwahed
(74) *Attorney, Agent, or Firm*—Keusey, Tutunjian & Bitetto, P.C.

(57) ABSTRACT

There is provided a rotary aircraft and launching assembly that includes a launching platform, a hub, and a plurality of blades. The launching platform has a funnel-shaped portion. The hub has a cone-shaped portion for being supported by the funnel-shaped portion of the launching platform during at least a launching of the rotary aircraft. The plurality of blades extends generally outwardly from the hub for generating lift.

20 Claims, 7 Drawing Sheets

FLYING TOY VEHICLE

BACKGROUND OF THE INVENTION

1. Field of the Invention

The present invention generally relates to toys and, more particularly, to a flying toy vehicle.

2. Background of the Invention

The term "rotary aircraft" is used to designate conventional rotary-wing aircraft such as helicopters having fuselages designed for independent non-rotational positioning with respect to a rotary wing and to aircraft lacking such fuselages.

It is well know to aeronautical engineers familiar with rotor design that a fixed-pitch rotor is inherently unstable in hover. A rotor comprising a hub with a plurality of blades, which are fixed in pitch with respect to the hub, will, when operated in hover (i.e. without horizontal movement), be disturbed by any incident wind perpendicular to the axis of rotation. The disturbance is characterized by the aerodynamic center of the rotor moving from the axis of rotation towards the source of the wind. The resulting aerodynamic imbalance causes the rotor to pitch. Because it is spinning, gyroscopic forces also cause the rotor to roll in a direction dependent upon the sense of rotor rotation. These combined forces act to cause the rotor to follow a circular flight path and this can cause the rotor to increase in pitch and roll in an uncontrolled manner.

As such, the blades of rotary aircraft are susceptible to damage from impacts resulting from unintentionally crashing the rotary aircraft when in hover. Of course, a crash due to any circumstance may cause damage to the blades of the rotary aircraft. Moreover, the blades of a rotary aircraft are susceptible to damage from impacts when landing, particularly when the blades rotate in a direction at least partially perpendicular to the ground.

Accordingly, it would be desirable and highly advantageous to have apparatus for protecting the blades of rotary aircraft from damage due to any circumstance and to further have a flying toy vehicle that includes such apparatus.

SUMMARY OF THE INVENTION

The problems stated above, as well as other related problems of the prior art, are solved by the present invention, which is directed to a flying toy vehicle.

According to an aspect of the present invention, there is provided a rotary aircraft and launching assembly that includes a launching platform, a hub, and a plurality of blades. The launching platform has a funnel-shaped portion. The hub has a cone-shaped portion for being supported by the funnel-shaped portion of the launching platform during at least a launching of the rotary aircraft. The plurality of blades extends generally outwardly from the hub for generating lift.

According to another aspect of the present invention, there is provided a rotary aircraft that includes a hub, a plurality of blades, and at least one propulsion device. The plurality of blades extends generally outwardly from the hub for generating lift. The at least one propulsion device is mounted to at least one of the plurality of blades. The at least one propulsion device has propellers and at least one downrib. The downrib is disposed on the at least one of the plurality of blades, proximate to the at least one propulsion device, for protecting at least the propellers of the at least one propulsion device from impact damage.

According to yet another aspect of the present invention, there is provided a rotary aircraft that includes a hub, a plurality of blades, and at least one connector. The plurality of blades extends generally outwardly from the hub for generating lift. The at least one connector connects at least one blade from among the plurality of blades to the hub such that the at least one blade is partially releasable from the hub upon an impact so as to dissipate any impact forces imparted upon the at least one blade.

According to still yet another aspect of the present invention, there is provided a rotary aircraft that includes a hub, a plurality of blades, a plurality of blade attachment devices, and at least one connector. The plurality of blades extends generally outwardly from the hub for generating lift. Each of the plurality of blade attachment devices respectively attaches one of the plurality of blades to the hub. The at least one connector connects the hub to at least one blade attachment device having a blade attached thereto such that the blade is partially releasable from the hub upon an impact to the blade so as to dissipate any impact forces imparted upon the blade.

These and other aspects, features and advantages of the present invention will become apparent from the following detailed description of preferred embodiments, which is to be read in connection with the accompanying drawings.

DETAILED DESCRIPTION OF THE INVENTION

Figure 1:
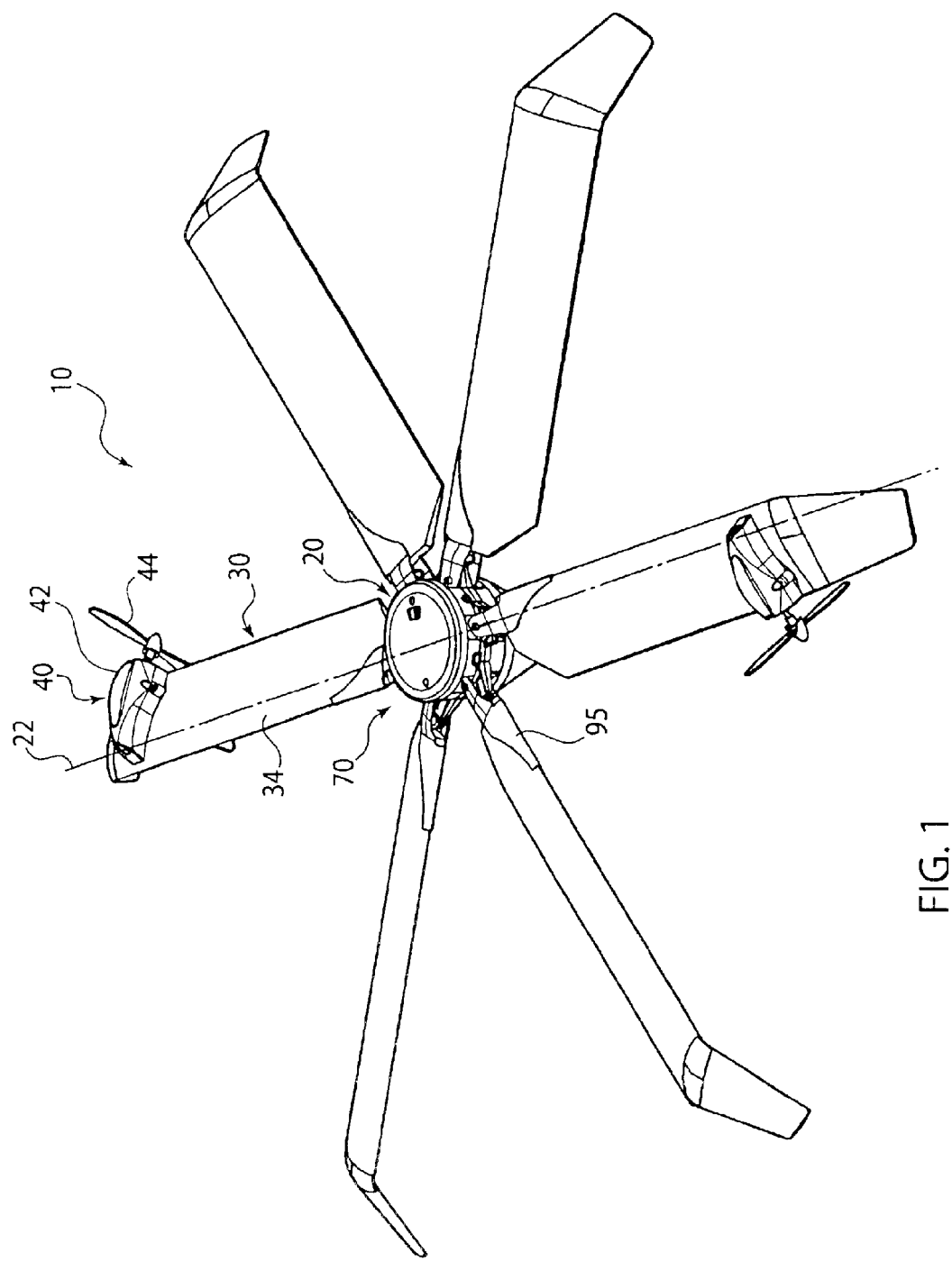
FIG. 1 is a perspective diagrammatic view of a rotary-wing aircraft 10, according to an illustrative embodiment of the present invention.

The present invention is directed to a flying toy vehicle. For further details on some aspects of the flying toy vehicle described herein, reference is made to U.S. Pat. No. 5,297, 759, issued on Mar. 29, 1994, the entire disclosure of which is incorporated by reference herein.

Certain terminology is used in the following description for convenience only and is not intended to be limiting. The words "right," "left," "lower" and "upper" designate directions in the drawings to which reference is being made. Also, in the drawings, like numerals are used to indicate like elements throughout.

There is shown in the figures a preferred embodiment rotary aircraft of the present invention, indicated generally at 10, in the form of a generally planar, unmanned, radio controlled, flying disk.

FIG. 1 is a perspective diagrammatic view of a rotary-wing aircraft 10, according to an illustrative embodiment of the present invention. The aircraft 10 comprises a hub 20 having a central axis 22 and a plurality of preferably substantially identical blade assemblies 30 extending at least generally outwardly from the hub 20. The plurality of blade assemblies 30 of aircraft 10 is preferably substantially uniformly spaced around the hub 20 and central axis 22, at sixty degree intervals for each of the six indicated blade assemblies 30. At least one and preferably a plurality of propulsion devices, each indicated generally at 40, are further provided. Each propulsion device 40 is mounted to and coupled with a separate, single blade assembly 30. Two or more propulsion devices 40 are preferably provided, depending upon the particular configuration of the aircraft, so that the propulsion devices 40 may be located symmetrically on the aircraft 10 in a manner to develop uniform torque and uniform lift in an upward direction. In an aircraft having an even number of blades, an even number of propulsion devices are preferably provided in diametrically opposed pairs (as shown). In an aircraft having an odd number of blades, an equal, odd number of identical propulsion devices preferably would be provided.

Preferably, each propulsion device 40 comprises a prime mover 42 and a propeller 44 coupled with the prime mover 42 for rotation by the prime mover 42. More particularly, prime mover 42 may be an electric motor or gasoline engine with or without a transmission. Alternatively, a rocket motor, a jet engine or a source of high pressure gas (compressed or chemical reaction) might be employed as or as part of the propulsion device, either to drive a propeller through a coupled turbine or to provide thrust directly from the discharge of high velocity gases.

The major proportion of lift generated by aircraft 10 is preferably generated through blade assemblies 30. Preferably, each of the blade assemblies 30 is substantially identical. Each includes a blade 34 that is configured and oriented to generate lift when the hub 20 and blades 34 are rotated in the common rotational direction (counterclockwise in FIG. 1).

Figure 2:
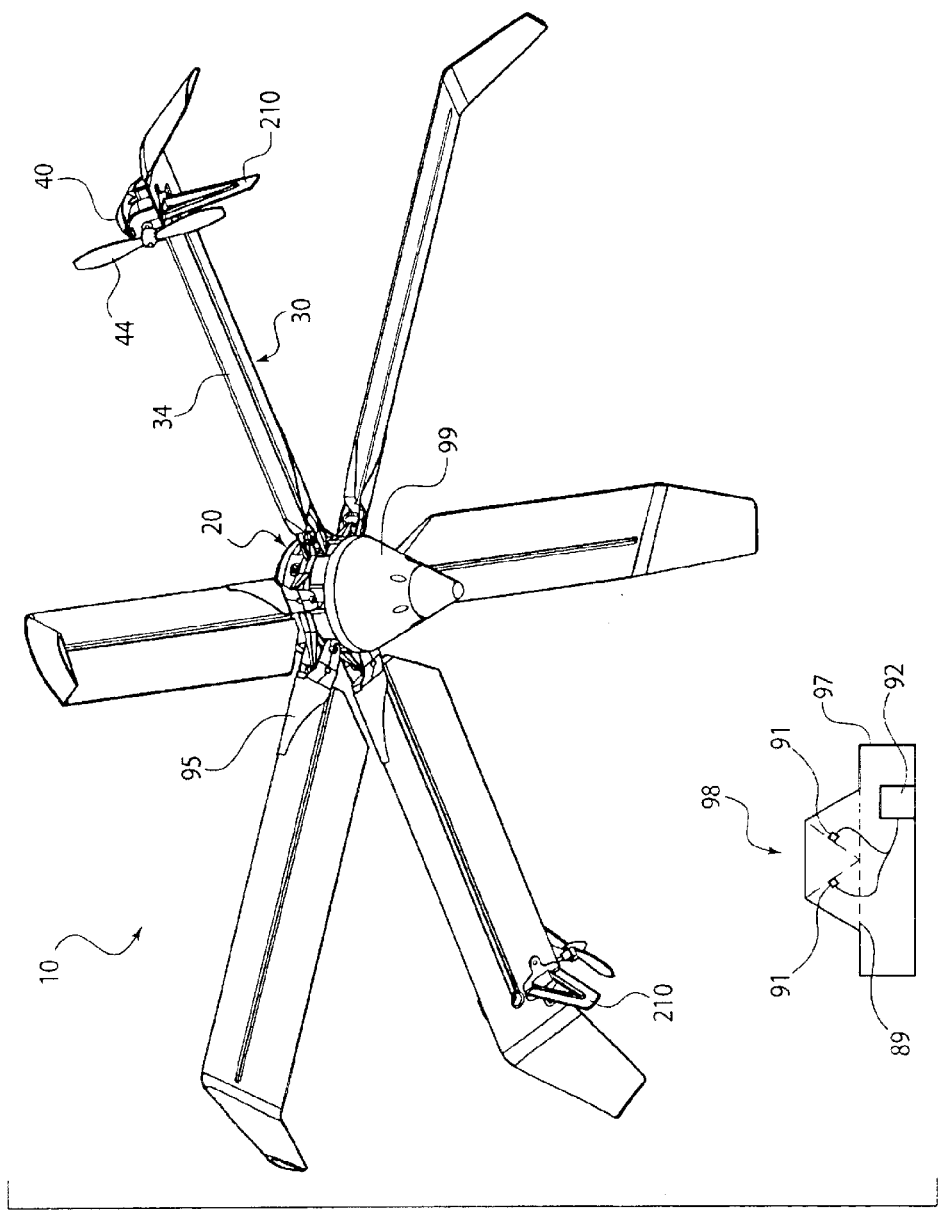
FIG. 2 is a perspective diagrammatic view of a rotary-wing aircraft 10 and a launching/charging platform 97 there for, according to an illustrative embodiment of the present invention.

FIG. 2 is a perspective diagrammatic view of a rotary-wing aircraft 10 and a launching/charging platform 97 therefor, according to an illustrative embodiment of the present invention. Advantageously, the present invention provides protection to at least the propellers 44 of the propulsion devices 40 from impact damage via downribs 210. The downribs 210 are arranged proximate to each propulsion device 40 to protect at least the propellers 44 of the propulsion devices 40 from impact damage that may occur, for example, during a hard landing. Conventionally, in a hard landing, the blades 34 would deflect upon impact causing the propellers 44 to contact the ground and sustain damage. Advantageously, the downribs 210 prevent damage to the propellers 44 by maintaining a required clearance between the propellers 44 and the landing surface. The downribs 210 are preferably injected molded from a stiff plastic, but may be made from other materials and other manufacturing processes, as readily determined by one of ordinary skill in the related art while maintaining the spirit and scope of the present invention.

Advantageously, the hub 20 includes an inverted cone-shaped portion 99. The cone-shaped portion 99 contacts and is supported by a funnel-shaped top portion 98 of a launching/charging platform 97. As such, aircraft 10 can vertically take off (launch) from the launching/charging platform 97. The funnel-shaped top portion 98 of the launch/charging platform 97 is intended to provide a reduced friction surface for supporting the cone-shaped portion 99 of the aircraft 10 so that the cone-shaped portion 99 can spin therein while building up revolutions (i.e., RPM) and airspeed over the wings and thereby enough lift for vertically launching from the launching/charging platform 97.

Thus, the inverted cone-shaped portion 99 and the funnel-shaped top portion 98 allow the rotary aircraft to takeoff from uneven, rocky or grassy terrain. The cone-shaped portion 99 and the funnel-shaped top portion 98 effectively elevate the hub 20 and blades 34 so that the rotary aircraft 10 never contacts the ground at any point for relatively frictionless liftoffs. Moreover, use of the cone-shaped portion 99 and the funnel-shaped top portion 98 results in reduced wear and tear on the rotary aircraft 10.

The funnel-shaped top portion 98 of the launching/charging platform 97 may be permanently or releasably mounted to the launching/charging platform 97. In the latter case, the separation of the launching/charging platform 97 and the funnel-shaped top portion 98 provides a lower profile for storage purposes. A separation line 89 shows where separation preferably is to occur between the launching/charging platform 97 and the funnel-shaped top portion 98. It is to be appreciated that the launching/charging platform 97 and the funnel-shaped top portion 98 may be connected together using any type of connector that allows a user to readily connect and disconnect the two elements.

The launching/charging platform 97 includes a charging circuit 92 for charging a rechargeable battery (not shown) disposed in the rotary aircraft 10. The charging circuit 92 may include a manual connector and wire for connecting the charging circuit 92 to the rechargeable battery through the hub 20.

Alternatively, the charging circuit may include contacts 91 disposed on the funnel-shaped portion 98 that electrically connect to other contacts (not shown) disposed on the cone-shaped portion 99 of the hub 20 so that when the rotary aircraft (in particular, the cone-shaped portion 99) is disposed in a pre-designated orientation in the funnel-shaped top portion 98 of the launching/charging platform 97, the rechargeable battery may be recharged. In one embodiment of the present invention, the contacts disposed on the funnel-shaped portion 98 and on the cone-shaped portion 99 are circular in shape and allow for electrical to be made as long as the cone-shaped portion 99 is seated in the funnel-shaped portion 98, irrespective of any orientation so that the contacts will always line up.

It is to be appreciated that the present invention is not limited to the preceding charging hardware configurations and approaches and, thus, other hardware configurations and approaches for charging may also be employed while maintaining the spirit of the present invention.

It is to be appreciated that while the funnel-shaped top portion 98 is described with respect to a combination launching platform and charger, the funnel-shaped top portion 98 may be implemented with respect to solely a launching platform while maintaining the spirit of the present invention.

Figure 3:
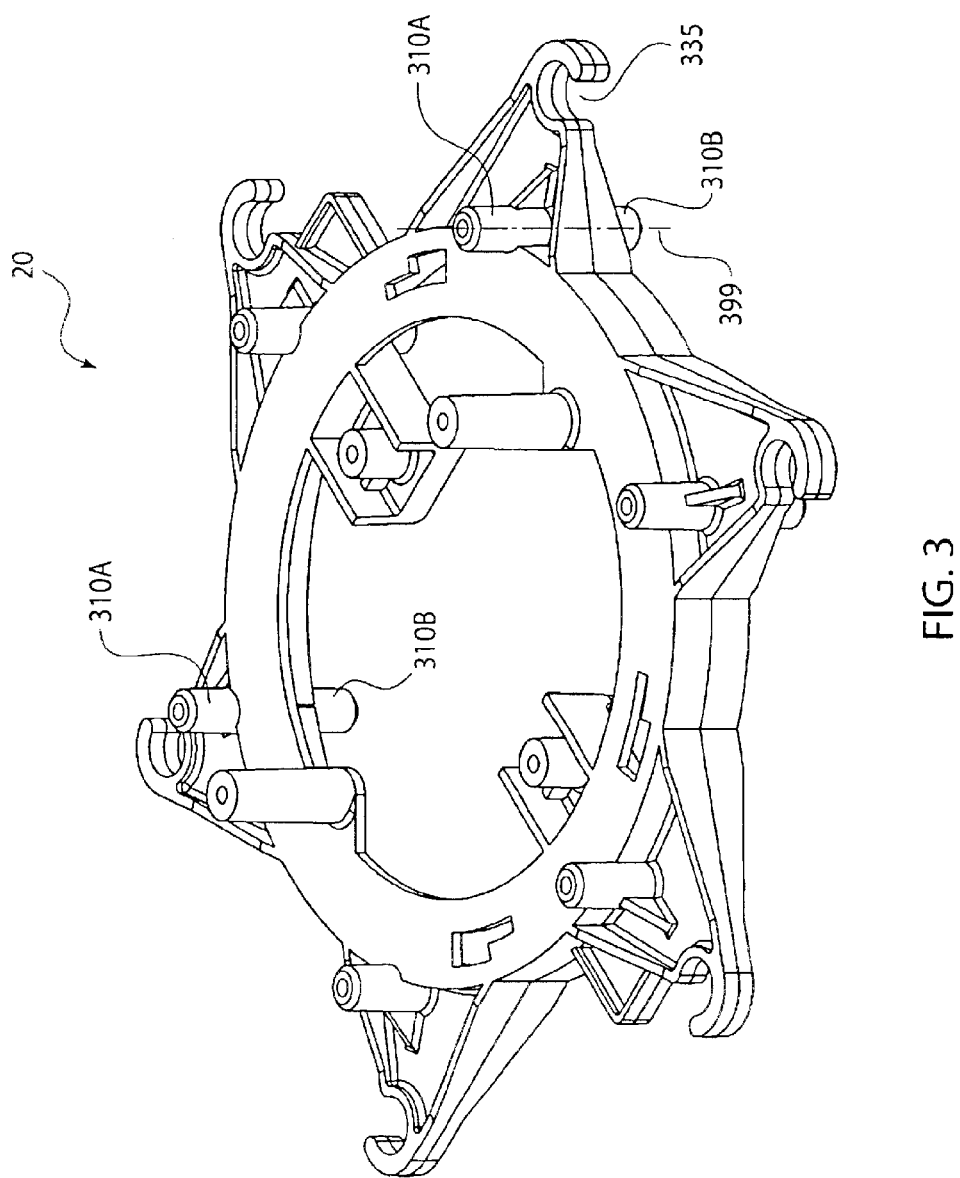
FIG. 3 is a diagram further illustrating the hub 20 shown in FIGS. 1 and 2, according to an illustrative embodiment of the present invention.
Figure 5:
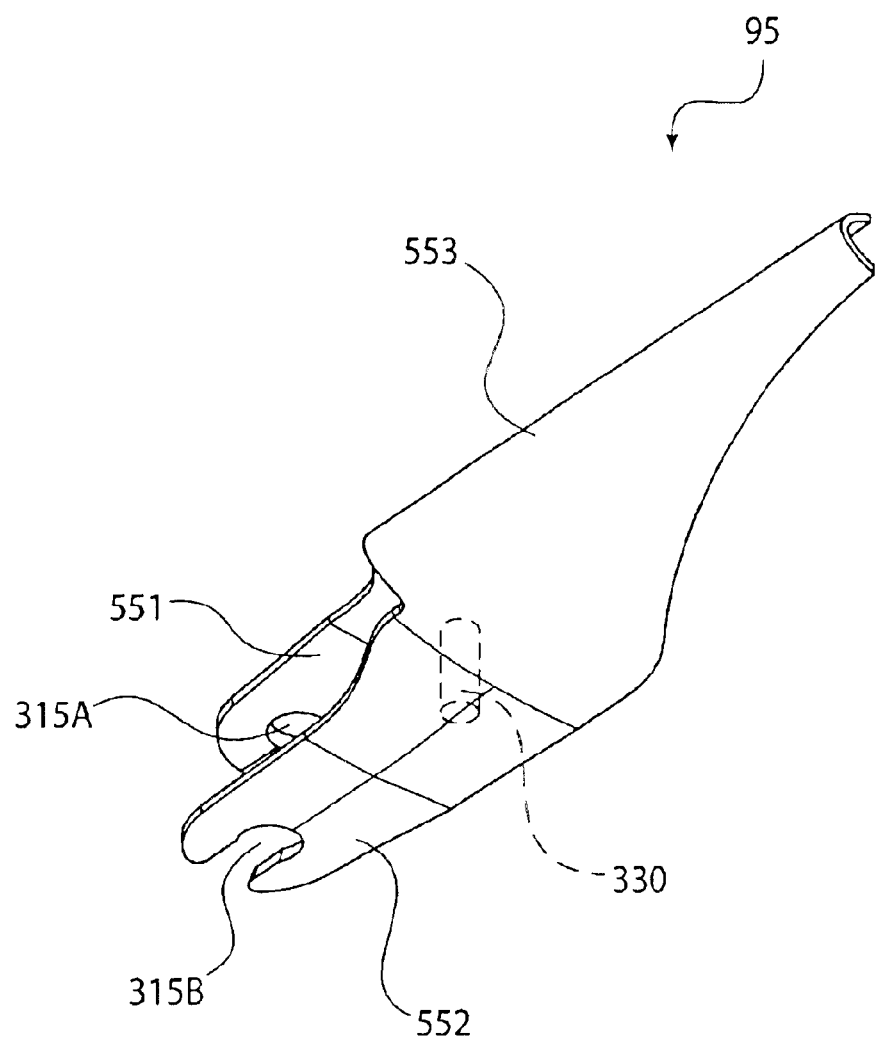
FIG. 5 is a diagram further illustrating the blade attachment device 95 shown in FIGS. 1 and 2, according to an illustrative embodiment of the present invention.
Figure 6:
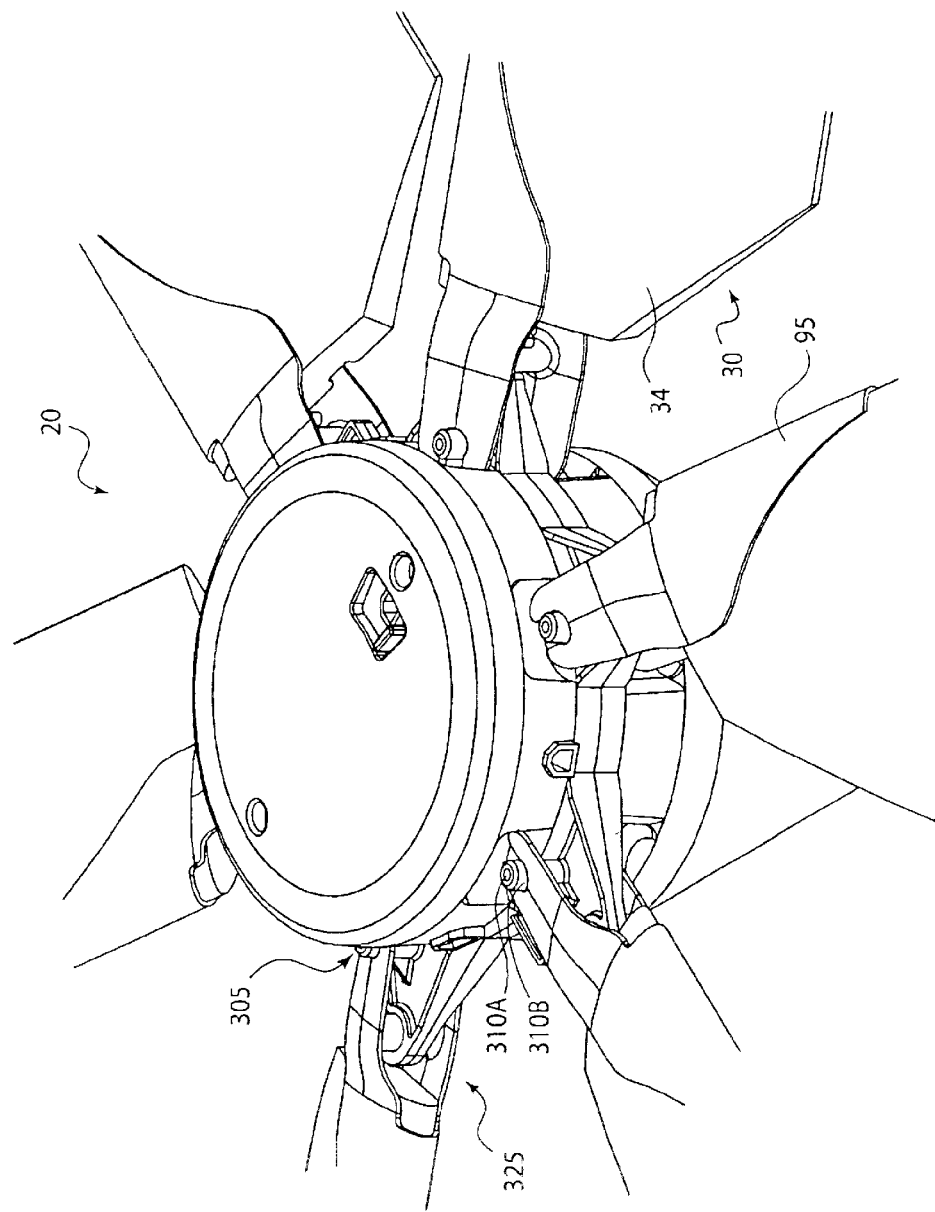
FIG. 6 is a perspective top view further illustrating the coupling of the hub 20 to the blade attachment device 95 shown in FIGS. 1 and 2, according to an illustrative embodiment of the present invention.
Figure 7:
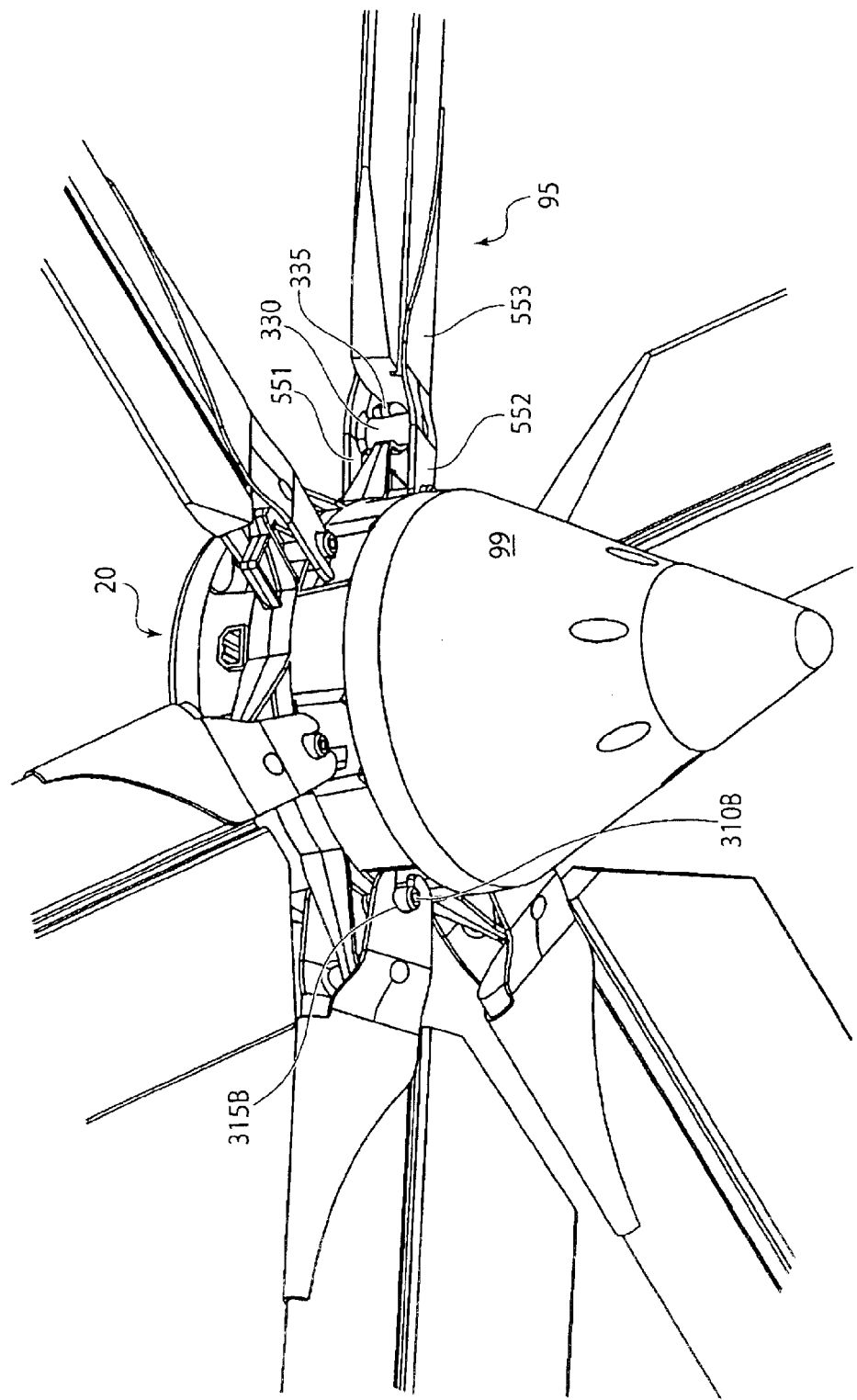
FIG. 7 is a perspective bottom view further illustrating the coupling of the hub 20 to the blade attachment device 95 shown in FIGS. 1 and 2, according to an illustrative embodiment of the present invention.

FIGS. 3 and 5–7 illustrate a feature of the present invention that dissipates impact forces to the blades 34 and the overall aircraft 10 in the event of a crash. FIG. 3 is a diagram further illustrating the hub 20 (internally) shown in FIGS. 1 and 2, according to an illustrative embodiment of the present invention. FIG. 5 is a diagram further illustrating the blade attachment device 95 shown in FIGS. 1 and 2, according to an illustrative embodiment of the present invention. FIGS. 6 and 7 are perspective top and bottom views of the rotary aircraft 10, respectively, further illustrating the coupling of the hub 20 to the blade attachment device 95 shown in FIGS. 1 and 2, according to an illustrative embodiment of the present invention.

Each blade 34 of the rotary aircraft 10 is coupled to the hub 20 via a corresponding blade attachment device 95. Each blade attachment device 95 includes a first portion 551, a second portion 552, and a third portion 553. The first portion 551 and the second portion 552 of each blade attachment device 95 are connected to the hub 20, and the third portion 553 of each blade attachment device 95 is connected to a corresponding wing blade 34.

For a given blade 34, the third portion 553 of the blade attachment device 95 is coupled to that blade 34 via an adhesive, fastener, pressure fitting, and/or any other method for accomplishing the same as readily determined by one of ordinary skill in the related art.

Moreover, the first portion 551 and the second portion 552 of the blade attachment device 95 are coupled to the hub 20 via a pivot device 305 and a clip device 325. Advantageously, the pivot device 305 and the clip device 325 allow for the dissipation of impact forces to the blades 34 and the overall aircraft 10 in the event of a crash, as is further described herein. This is accomplished by clip device 325 releasing from the hub 20 during an impact so as to allow an affected blade attachment device 95 (and hence the blade 34 connected thereto) to pivot away from an impact surface via the pivot device 305. In this way, impact damage to the affected blade(s) 34 and the overall aircraft 10 is avoided or, at the least, greatly diminished.

Each pivot device 305 includes an upper post 310A and a lower post 310B, disposed substantially in vertical alignment with each other on opposing faces of the hub 20. Each pivot device 305 further includes an upper post receiving portion 315A and a lower post receiving portion 315B disposed on the first portion 551 and the second portion 552 of a corresponding blade attachment device 95, for receiving and securing the upper post 310A and the lower post 310B disposed on the hub 20.

Each clip device 325 includes a dowel portion 330 disposed on a corresponding blade attachment device 95 and a dowel receiving portion 335 disposed on the hub 20.

With respect to the pivot device 305, each of the upper post receiving portion 315A and the lower post receiving portion 315B may be, for example, simply a recess, a cutout, a hollow cylinder, or some other structure that is capable of receiving and securing the upper post 310A and the lower post 310B. In one embodiment of the present invention, the posts (either or both of upper post 310A and lower post 310B) may include protuberances (not shown) that provide a pressure fit inside the corresponding receiving portions (upper post receiving portion 315A and lower post receiving portion 315B). Moreover, the receiving portions (upper post receiving portion 315A and lower post receiving portion 315B) may include recesses for receiving and securing the protuberances to provide a more positive engagement between the upper post 310A and the upper post receiving portion 315A and between the lower post 310B and the lower post receiving portion 315B.

In the embodiment shown in FIG. 5, the upper post receiving portion 315A is a cutout in the first portion 551 of the blade attachment device 95 that fully encircles at least a portion of the upper post 310A, and the lower post receiving portion 315B is a cutout in the second portion 552 of the blade attachment device 95 that is c-shaped so as to partially encircle at least a portion of the lower post 310B. As such, the blade attachment device 95 is attached to the hub 20 such that the upper post receiving portion 315A is first secured to the upper post 310A by simply placing the upper post receiving portion 315A over the upper post 310A, and then the lower post receiving portion 315B is secured to the lower post 310B by pivoting the blade attachment device towards the hub 20 so that an opening of the lower post receiving portion 315B is located in alignment with the lower post 310B and then the lower post receiving portion 315B is pushed towards the lower post 310B so as to snap or lock-in the lower post receiving portion 315B onto the lower post 310B.

In another embodiment of the present invention, the blade attachment device 95 is attached to the hub 20 such that the upper post receiving portion 315A is first secured to the upper post 310A and then the lower post receiving portion 315B is secured to the lower post 310B by pivoting the blade attachment device towards the hub 20 so as to directly snap-in the lower post receiving portion 315B to the lower post 310B without orienting the lower post receiving portion 315B over or under the lower post 310B and pushing them together.

Once connected, the pivot device 305 allows the blade 34 that is connected to the blade attachment device 95 to pivot along a longitudinal axis 399 that runs through both the upper post 310A and the lower post 310B.

With respect to the clip device 325, the dowel receiving portion 335 may simply be a projection from the hub 20 that has a c-shape for receiving and securing (e.g., clipping or snapping in) the dowel portion 330 in position and for allowing the dowel portion 330 to unclip or snap out of position upon an impact to the corresponding blade 34.

Once the pivot device 305 has been used to connect the blade attachment device 95 to the hub 20, then the clip device 325 is attached. Since, as noted above, the blade attachment device 95 and hence the blade 34 attached thereto pivot along a longitudinal axis 399 of the upper post 310A and the lower post 310B when the pivot device 305 has been employed, the blade attachment device 95 is simply pivoted along the longitudinal axis 399 so as to clip or snap-in the dowel portion 330 to the dowel receiving portion 335. That is, the blade attachment device 95 is simply rotated along the longitudinal axis until the dowel receiving portion 335 is secured to the dowel portion 330.

In the event of an impact to one or more of the blades 34, the clip device 325 associated with each blade 34 allows the blade 34 to become unclipped from the hub 20 yet still remain attached to the hub 20 via the pivot device 305. In this way, the affected blades 34 simply swing away from an impact surface while some or all of the impact forces to the blades 34 are dissipated. Moreover, this feature of the present invention advantageously allows the aircraft 10 to continue flying/hovering even if one or more of the blades 34 become unclipped. In addition, the clip device system of the present invention allows for easy and rapid wing attachment to the hub for assembly and/or replacement of wings as needed.

It is to be appreciated that while the present invention is described herein with respect to connecting each blade 34 to the hub 20 via a corresponding blade attachment device 95, the blade attachment devices 95 may be omitted in other embodiments of the present invention while still maintaining the overall benefits, features, and advantages of the present invention. For example, in the event that the blade attachment devices 95 are not employed, then the blades 34 may be directly coupled to the hub 20 through the use of the pivot devices 305 and the clip devices 325. In such a case, the portions of the pivot devices 305 and the clip devices 325 that are shown herein disposed on the blade attachment devices 95 would be disposed on the blades 34 themselves. Moreover, it is to be further appreciated that while the present invention is described herein with respect to the use of pivot devices 305 and clip devices 325, other devices (one or more) for attaching the blades 34 to the hub 20, either directly or indirectly, may also be employed that have the feature of dissipating impact forces in the event of a crash by allowing the involved blades 34 to at least partially disconnect from the hub 20. That is, given the teachings of the present invention provided herein, one of ordinary skill in the related art will contemplate these and various other configurations and implementations of the present invention while maintaining the spirit thereof. For example, in some embodiments of the present invention, a single connection device may be used having a single dowel or dowel-like element and other corresponding structure that allow a blade to dissipate impact energy by partially or even completely decoupling from the hub 20 while maintaining the spirit and scope of the present invention. In such an arrangement, a pre-specified degree of force corresponding to an impact would have to be applied to the corresponding wing for the wing to at least partially detach from the hub.

Figure 4:
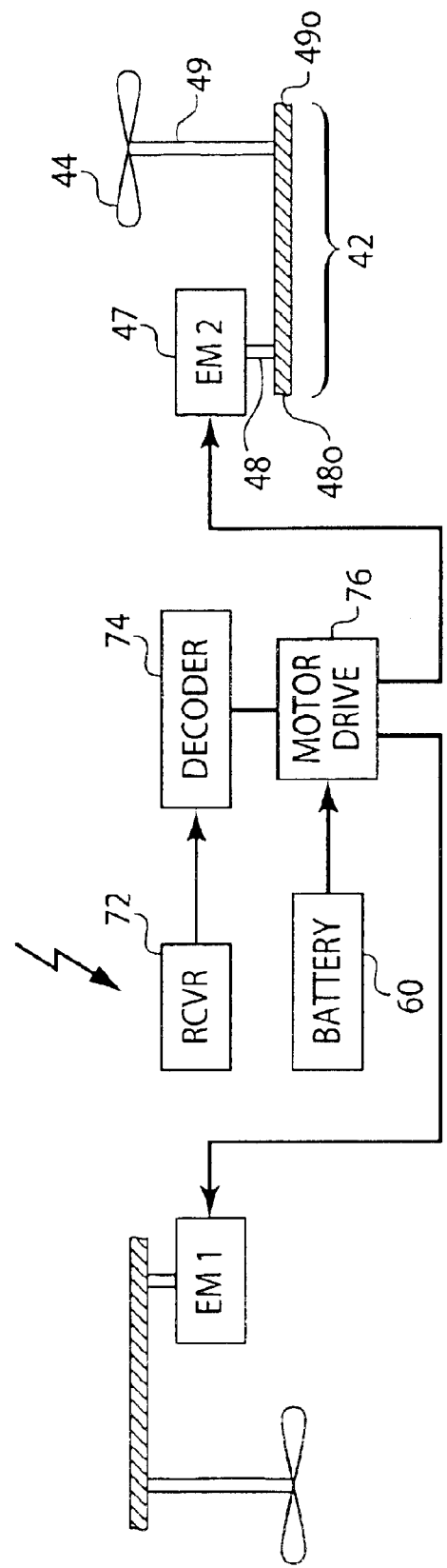
FIG. 4 is a block diagram of the power and control components of the rotary aircraft of FIGS. 1 and 2.

Preferably, rotary aircraft 10 is configured as a self-propelled, remotely controlled toy disk. FIG. 4 is a block diagram of the power and control components of the rotary aircraft 10 of FIGS. 1 and 2, according to an illustrative embodiment of the present invention. Referring to FIG. 4, each prime mover 42 preferably comprises a small, relatively powerful electric motor 47 (""EM1" AND ""EM2"), such as a Mabuchi Model FA-130 6-volt motor, having output shaft 48 mounting a pinion 48a driving a larger, reduction pinion 49a coupled to a parallel propeller shaft 49 coupled directly with the propeller 44. Wire pairs 38 are preferably passed from the hub 20 through channels in each wing 30 supporting a motor 47 to power the motor.

Preferably, the aircraft 10 is configured for free (untethered) flight, at least partially controlled by radio or other wireless signal transmission system. In this configuration, the aircraft 10 preferably includes an energy reservoir 60, such as a conventional rechargeable battery or pack of several batteries, which is supported by and preferably in hub 20. Reservoir/battery 60 supplies all power requirements of the aircraft 10 including those of propulsion devices 40. The aircraft 10 further preferably comprises a controller, preferably in the form of control circuitry, indicated generally at 70, which is provided for remotely controlling the aircraft 10, to the extend it can be controlled, by controlling the amount of electricity supplied to the propulsion devices 40 from battery/reservoir 60. Varying the electric power supplied from the battery/reservoir 60 to the electric motors 47 of the propulsion devices 40 permits altitude control of the aircraft 10.

Any of a variety of known control systems may be implemented in the aircraft 10. The simplest system involves merely switching on and off a fixed voltage/amperage current generated by the reservoir 60. More elaborate systems may be employed. For example, variable electric power may be supplied to the propulsion devices 40 and variable speed achieved by varying the voltage or amperage of the direct current supplied from battery/reservoir 60 to the electric motors 47 or by varying a defined duty cycle of a constant voltage/amperage current supplied to the motors. Also, the system can be configured to individually vary power supplied to the motors for performing stunts, if desired.

Preferably, the controller 70 includes a receiver 72 which detects control signals generated and transmitted in a conventional fashion by a portable ground control transmitter (not depicted), an optional decoder 74 for decoding control signals detected by the receiver 72, if decoding is necessary for the control scheme employed, and a motor driver 76 responsive to output from the decoding circuit 74, or directly from the radio receiver if the decoder is omitted, for varying the electric power supplied from the battery/reservoir 60 to each propulsion device 40. Motor driver 74 may be as simple as an on-off power transistor or a more complicated circuit varying amperage, voltage or a duty cycle. Some or all of these elements and circuits may be integrated together into a single circuit mounted on a single PC board.

It is preferred that the toy aircraft 10 be constructed of lightweight, resiliently flexible materials including, but not limited to, solid and/or foamed plastics, balsa and/or other lightweight woods, honeycombed or porous metal, Kevlar™, fiberglass or other composite materials. Injection-molded polymer foam is currently preferred for the hub and blades due to its low cost, light weight, strength and flexible resilience.

One of ordinary skill will appreciate that aircraft 10 could be coupled by wire to a ground controller providing current from a ground power source directly to the motors through slip ring couplings, for example, in the hub 10.

While preferred embodiments of the invention have been described and certain modifications thereto suggested, it will be recognized by those skilled in the art that other changes may be made to the above-described embodiments in the invention without departing from the broad, inventive concepts thereof. It should be understood, therefore, that the invention is not limited to the particular embodiments disclosed but covers any modifications that are within the scope and spirit of the invention as defined by the appended claims.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A rotary aircraft, comprising:
    a hub;
    a plurality of blades extending generally outwardly from said hub for generating lift; and
    at least one connector for connecting at least one blade from among said plurality of blades to said hub such that said at least one blade is partially releasable from said hub upon an impact so as to dissipate any impact forces imparted upon said at least one blade during rotation of said hub.

2. The rotary aircraft according to claim 1, wherein said at least one connector comprises two connection devices between said at least one blade and said hub, one of said two connection devices for remaining connected during the impact but allowing said at least one blade to pivotally move away from an impact surface and the other of said two connection devices for disconnecting during the impact.

3. The rotary aircraft according to claim 1, wherein said at least one connector comprises:

a pivot device for pivotally connecting said hub to said at least one blade; and a clip device for connecting said hub to said at least one blade, wherein said pivot device remains pivotally connected while said clip device releases during the impact, so as to allow said at least one blade to pivot away from an impact surface and dissipate the impact forces imparted upon said at least one blade.

4. The rotary aircraft according to claim 3, wherein said pivot device comprises:

at least one post disposed on said hub; and at least one post receiving portion disposed on said at least one blade.

5. The rotary aircraft of claim 4, wherein said at least one post receiving portion comprises one of a cutout, a recess, and a cylinder for receiving at least part of said at least one post.

6. The rotary aircraft according to claim 3, wherein said pivot device comprises:

a first post and a second post disposed in vertical alignment with each other on opposing faces of said hub; and a first post receiving portion and a second post receiving portion disposed on said at least one blade for respectively receiving and securing said first post and said second post so as to allow said blade to pivot on a longitudinal axis of said first post and said second post.

7. The rotary aircraft according to claim 3, wherein said clip device comprises:

a dowel portion disposed on said at least one blade; and a dowel receiving portion disposed on said hub for receiving and securing said dowel portion in a non-impact condition and for releasing said dowel portion in a subsequent impact condition.

8. The rotary aircraft of claim 7, wherein said dowel receiving portion comprises a projection having a c-shape for receiving and releasably securing the dowel portion.

9. A rotary aircraft, comprising:

a hub;

a plurality of blades extending generally outwardly from said hub for generating lift;

a plurality of blade attachment devices, each for respectively attaching one of said plurality of blades to said hub; and at least one connector for connecting said hub to at least one blade attachment device having a blade attached thereto such that said blade is partially releasable from said hub upon an impact to said blade so as to dissipate any impact forces imparted upon said blade during rotation of said hub.

10. The rotary aircraft according to claim 9, and wherein said at least one connector comprises two connection devices between said hub and said at least one blade attachment device having said blade attached thereto, one of said two connection devices for remaining connected during the impact but allowing said blade to pivotally move away from an impact surface and another one of said two connection devices for disconnecting during the impact.

11. The rotary aircraft according to claim 9, wherein said at least one connector comprises:

a pivot device for pivotally connecting said hub to said at least one blade attachment device having said blade attached thereto; and a clip device for connecting said hub to said at least one blade attachment device having said blade attached thereto, wherein said pivot device remains pivotally connected during the impact and said clip device releases during the impact, so as to allow said blade to pivot away from an impact surface and dissipate the impact forces imparted upon said blade.

12. The rotary aircraft according to claim 11, wherein said pivot device comprises:

at least one post disposed on said hub; and at least one post receiving portion disposed on said blade attachment device having the blade attached thereto.

13. The rotary aircraft of claim 12, wherein said at least one post receiving portion comprises one of a cutout, a recess, and a cylinder for receiving at least part of said at least one post.

14. The rotary aircraft according to claim 11, wherein said pivot device comprises:

a first post and a second post disposed in vertical alignment with each other on opposing faces of said hub; and a first post receiving portion and a second post receiving portion disposed on said at least one blade attachment device for respectively receiving and securing said first post and said second post so as to allow said at least one blade attachment device and said blade attached thereto to pivot on a longitudinal axis of said first post and said second post.

15. The rotary aircraft according to claim 11, wherein said clip device comprises:

a dowel portion disposed on said at least one blade attachment device having said blade attached thereto; and a dowel receiving portion on said hub.

16. The rotary aircraft of claim 15, wherein said dowel receiving portion comprises a projection having a c-shape for receiving and releasably securing the dowel portion.

17. The rotary aircraft according to claim 1, further comprising at least one propulsion device mounted to at least one of said plurality of blades, said at least one propulsion device having a propeller.

18. The rotary aircraft according to claim 17, further comprising at least one downrib disposed on said at least one blade having said at least one propulsion device for protecting said propeller from impact damage.

19. The rotary aircraft according to claim 9, further comprising at least one propulsion device mounted to at least one of said plurality of blades, said at least one propulsion device having a propeller.

20. The rotary aircraft according to claim 19, further comprising at least one downrib disposed on said blade having said at least one propulsion device for protecting said propeller from impact damage.

* * * * *